(12) United States Patent
Watson et al.

(10) Patent No.: US 9,468,166 B2
(45) Date of Patent: Oct. 18, 2016

(54) AUTOMATIC SUBTERRANEAN WATERING SYSTEM WITH REFILL INDICATOR AND GRIPPING MECHANISM

(71) Applicant: Sustainable Products, LLC, Atlanta, GA (US)

(72) Inventors: Milton B. Watson, Woodstock, GA (US); Tristram Zane Coffin, Atlanta, GA (US)

(73) Assignee: Sustainable Products, LLC, Atlanta, GA (US)

( * ) Notice: Subject to any disclaimer, the term of this patent is extended or adjusted under 35 U.S.C. 154(b) by 431 days.

(21) Appl. No.: 14/046,153

(22) Filed: Oct. 4, 2013

(65) Prior Publication Data

US 2015/0096228 A1 Apr. 9, 2015

(51) Int. Cl.
*A01G 25/00* (2006.01)
*A01G 9/02* (2006.01)
*A01G 27/00* (2006.01)

(52) U.S. Cl.
CPC ........... *A01G 27/008* (2013.01); *A01G 27/003* (2013.01); *A01G 27/005* (2013.01)

(58) Field of Classification Search
USPC ....... 47/79, 65, 65.5, 66.6, 66.7, 48.5, 59 R, 47/62 R, 63
See application file for complete search history.

(56) References Cited

U.S. PATENT DOCUMENTS

| | | | | |
|---|---|---|---|---|
| 4,864,771 A | * | 9/1989 | Fah | 47/79 |
| 5,502,924 A | * | 4/1996 | Lee | 47/79 |
| 6,219,969 B1 | * | 4/2001 | Dion | 47/79 |
| 6,363,658 B1 | * | 4/2002 | Lai | 47/79 |
| 6,848,483 B1 | * | 2/2005 | Atkinson et al. | 141/198 |
| 7,703,240 B2 | * | 4/2010 | Watson et al. | 47/79 |
| 8,146,292 B2 | * | 4/2012 | Brandstatter | 47/81 |
| 8,621,783 B2 | * | 1/2014 | Tsai | 47/79 |
| 2007/0022660 A1 | * | 2/2007 | Buitendag et al. | 47/81 |
| 2011/0154985 A1 | * | 6/2011 | Mittelmark | 95/1 |
| 2013/0074405 A1 | * | 3/2013 | Sohn | 47/66.6 |

FOREIGN PATENT DOCUMENTS

JP 05-137468 * 6/1993 ............ A01G 27/00

* cited by examiner

*Primary Examiner* — Andrea Valenti

(74) *Attorney, Agent, or Firm* — Laurence P. Colton; Smith Tempel Blaha LLC

(57) ABSTRACT

An automatic watering system includes a water storage reservoir and a water feed reservoir positioned elevationally below the water storage reservoir. The water feed reservoir has a plurality of water feed apertures aligned substantially horizontally for allowing water to pass from the water feed reservoir to outside of the water feed reservoir. The water feed reservoir is in fluid communication with the water storage reservoir via a water tube with a biased seal and via an air return conduit which has a float valve. The water storage reservoir is in fluid communication with the refill indicator for indicating a water level present within the water storage reservoir. The refill indicator includes a float body that tracks the water level within the water storage reservoir. The automatic watering system may also include a gripping mechanism positioned near a top portion of the water storage reservoir.

10 Claims, 6 Drawing Sheets

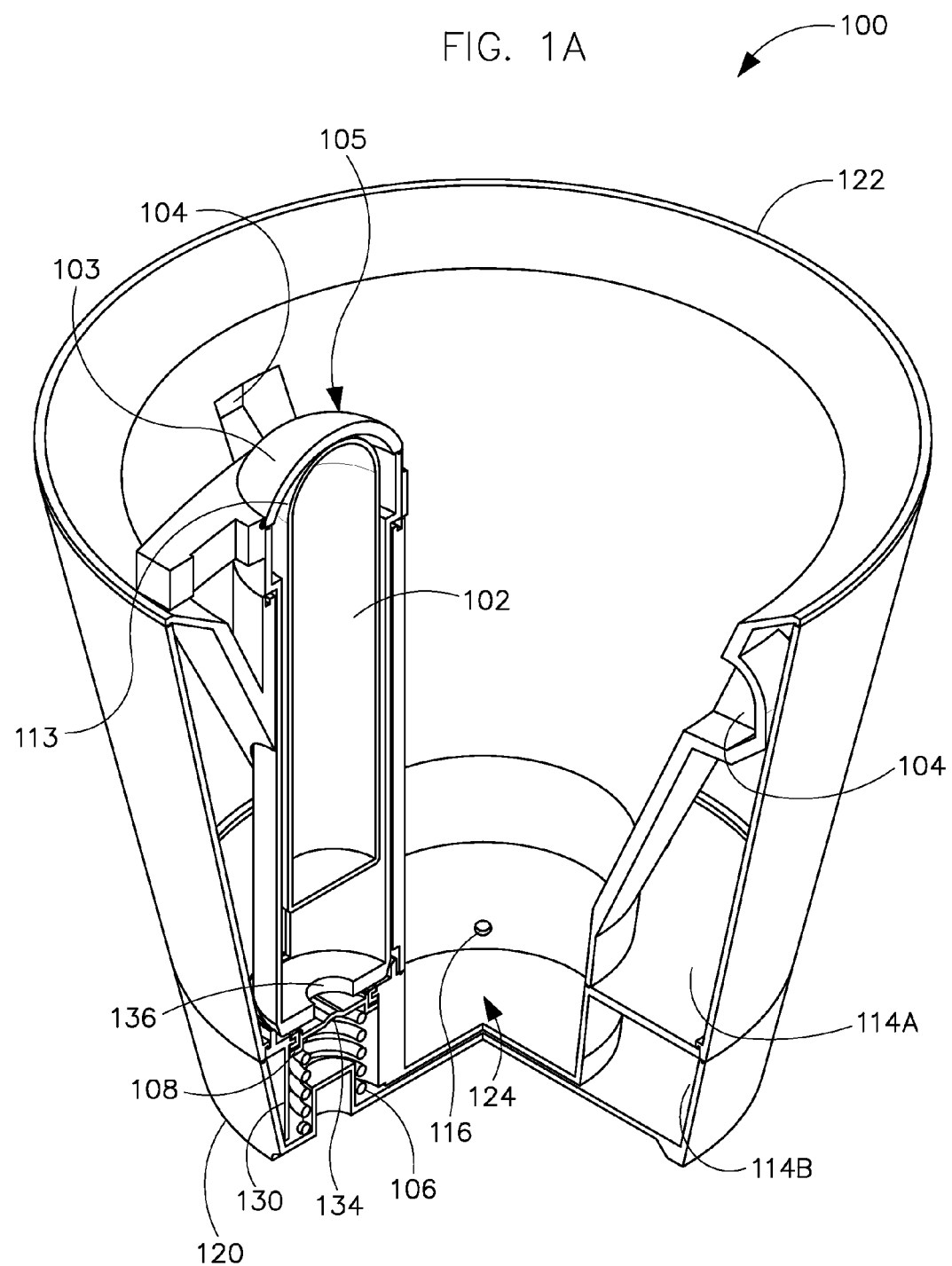

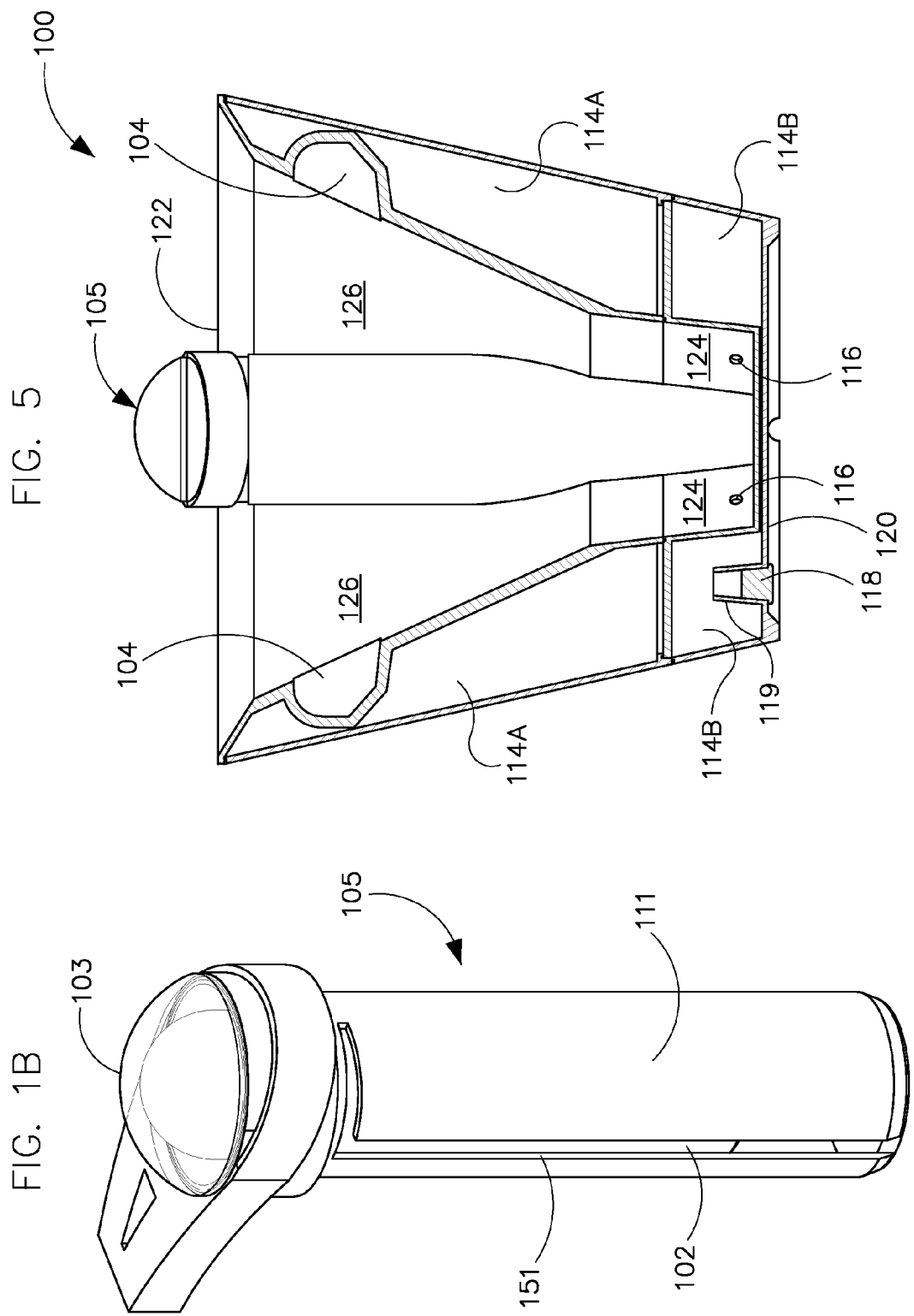

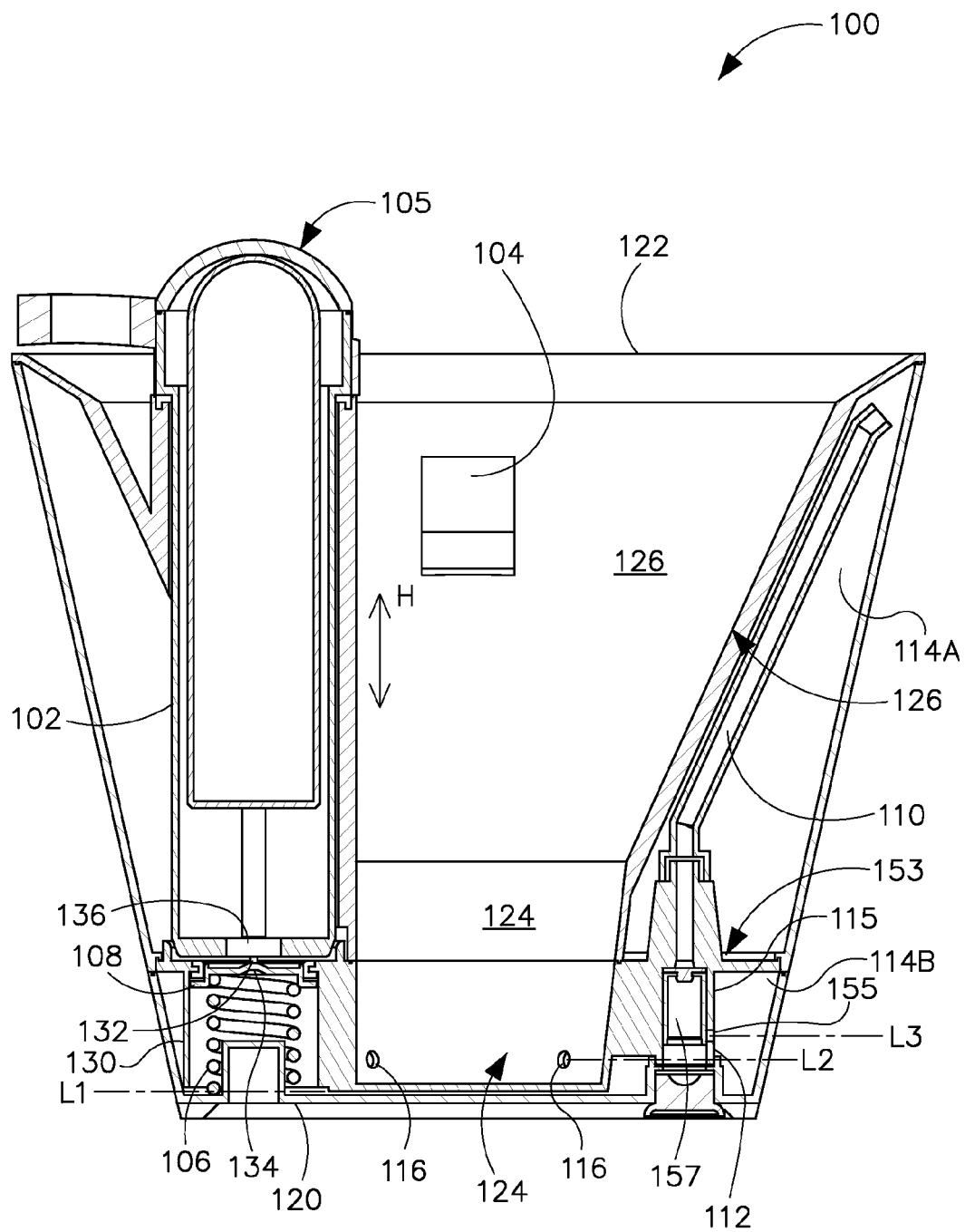

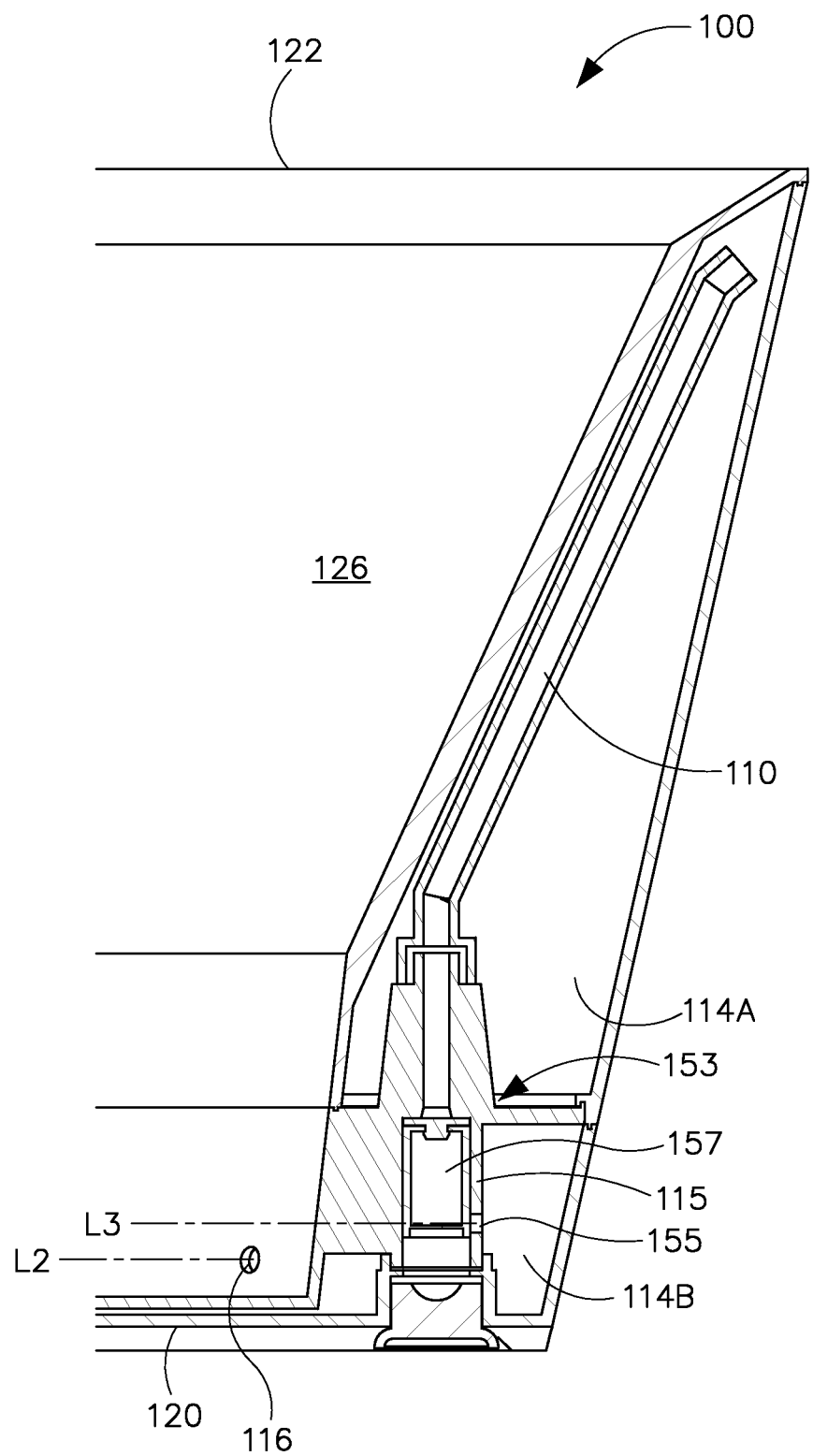

AUTOMATIC SUBTERRANEAN WATERING SYSTEM WITH REFILL INDICATOR AND GRIPPING MECHANISM

BACKGROUND OF THE INVENTION

1. Technical Field

This invention relates generally to the field of plant pots, and more particularly to a self-watering plant pot.

2. Prior Art

Numerous innovations for plant watering devices have been provided in the prior art. For example, as mentioned in the related art section of U.S. Pat. No. 7,703,240, many improvements to plant watering devices include no moving parts. However, these improved plant watering devices may require sensors (i.e. a porous sensing element, a dryness sensor, a hydrophilic polyethylene sensor, a hydrophilic sensor, etc.) to trigger the release of water to the roots of the plant.

As described in U.S. Pat. No. 7,703,240, none of these prior art plant watering devices teaches an automatic watering system for a plant that allows the root system to dehydrate before another watering cycle is initiated. Meanwhile, while the plant water device of U.S. Pat. No. 7,703,240 allows for the root system to dehydrate before another water cycle is initiated, the device does not provide for an efficient and operator-friendly way to indicate the present water level as it exists within the device. Further, if the automatic watering system is positioned within another container, such as a common plastic, clay or ceramic pot, the system does not lend itself for efficient and easy removal by hand from the pot as desired by an operator.

It can be seen that there is a need for an automatic watering system that provides for an efficient way to indicate a present water level within the system. Also needed is an automatic watering system which may be easily removed from a larger container, such as a flower pot, which may receive the automatic watering system. There is a further need for an automatic watering system that provides the user with an easy and simple set-up for use.

BRIEF SUMMARY OF THE INVENTION

Briefly, the present invention is an automatic watering system configured with a refill indicator that provides an efficient way to indicate a present water level within the system, and specifically within an upper water storage reservoir of the system. Additionally, the present invention can have a refill indicator that may be removed from the system as desired so as to provide for a water filling port for filling an upper water storage reservoir of the system. In other words, the refill indicator structure can serve multiple purposes for indicating the amount of water remaining in the water storage reservoir, for filling the water storage reservoir that is in fluid communication with a water feed reservoir, which in turn is in fluid communication with a plant growth medium in which the plant resides, and for opening and closing a valve or seal in the bottom of the upper water storage reservoir. The present invention also provides one or more gripping mechanisms such that the entire system may be easily removed from a larger container, such as a conventional and/or decorative flower pot.

The automatic watering system includes a water storage reservoir and a water feed reservoir positioned elevationally below the water storage reservoir. The water feed reservoir has a plurality of water feed apertures aligned substantially horizontally for allowing water to pass from the water feed reservoir to an interior volume of the system outside of the water feed reservoir, which interior volume is in the form of a receiving section for containing a plant and a plant growth medium. The water feed reservoir is in fluid communication with the water storage reservoir through the refill indicator structure and an air return conduit. The air return conduit has a float valve for reversibly sealing the air return conduit, which air return conduit assists in providing water from the water storage reservoir to the water feed reservoir when needed and in preventing water from moving from the water storage reservoir to the water feed reservoir when not needed.

The refill indicator is in fluid communication with the water feed reservoir and the upper water storage reservoir for indicating a water level present within the upper water storage reservoir. The refill indicator may include a float body which tracks a level of water within the upper water storage reservoir. In one exemplary embodiment, the refill indicator is removable from the automatic watering system.

The automatic watering system may include a seal within the water feed reservoir, which seal is activated by the refill indicator. The seal is coupled to a spring, which applies a force against the seal such that the seal closes the water feed reservoir upon rotating, moving, or removing the refill indicator from the automatic watering system. In this manner, when the refill indicator is rotated, moved, or removed from the system, water present in the water storage reservoir is prevented from entering the water feed reservoir, and when the refill indicator is coupled in the system, water present in the upper water storage reservoir can enter the refill indicator structure and act upon the float body to give an indication of the amount of water contained within the upper water storage reservoir.

The automatic watering system also may include a gripping mechanism positioned near a top portion of the water storage reservoir. The gripping mechanism comprises a geometry for receiving a shape corresponding to at least one of a finger or a thumb of an operator. The gripping mechanism allows an operator to more easily remove the system from a conventional and/or decorative flower pot. For example, the system can be placed inside of a second pot, which second pot has aesthetic functionality. If the second pot has interior dimensions similar to the exterior dimensions of the system, it may be difficult to remove the system from the second pot for cleaning, replanting, etc.

Thus, one feature of the present invention is to provide an automatic watering system that is capable of providing an efficient way to display a present water level within the system. Another feature of the present invention is to provide an automatic watering system that provides an operator with an indication of whether water needs to be added to the system. Still another feature of the present invention is to provide an automatic watering system that does not require complicated and/or costly sensors (i.e. a porous sensing element, a dryness sensor, a hydrophilic polyethylene sensor, a hydrophilic sensor, etc.) to trigger the release of water to the roots of the plant. Yet another feature of the present invention is to provide an automatic watering system that is easy to remove from a larger container, such as a flower pot. It is to these and other features that the present invention is directed.

BRIEF DESCRIPTION OF THE DRAWINGS

FIG. 1A is a perspective view of an embodiment of an automatic watering system with a refill indicator and gripping mechanisms according to the present invention.

FIG. 1B is a side view of the refill indicator removed from the receiving column or indicator sleeve of the upper water storage reservoir.

FIG. 2 is a side view of the embodiment of an automatic watering system with a refill indicator and gripping mechanisms as illustrated in FIG. 1A according to the present invention.

FIG. 3 is a partial side, cross-sectional view of an air return conduit visible in an embodiment for the automatic watering system of FIG. 1A according to the present invention.

FIG. 5 is another side cross-sectional view of the automatic watering system as illustrated in FIG. 1A according to the present invention.

DETAILED DESCRIPTION OF PREFERRED EMBODIMENTS

Figure 4:
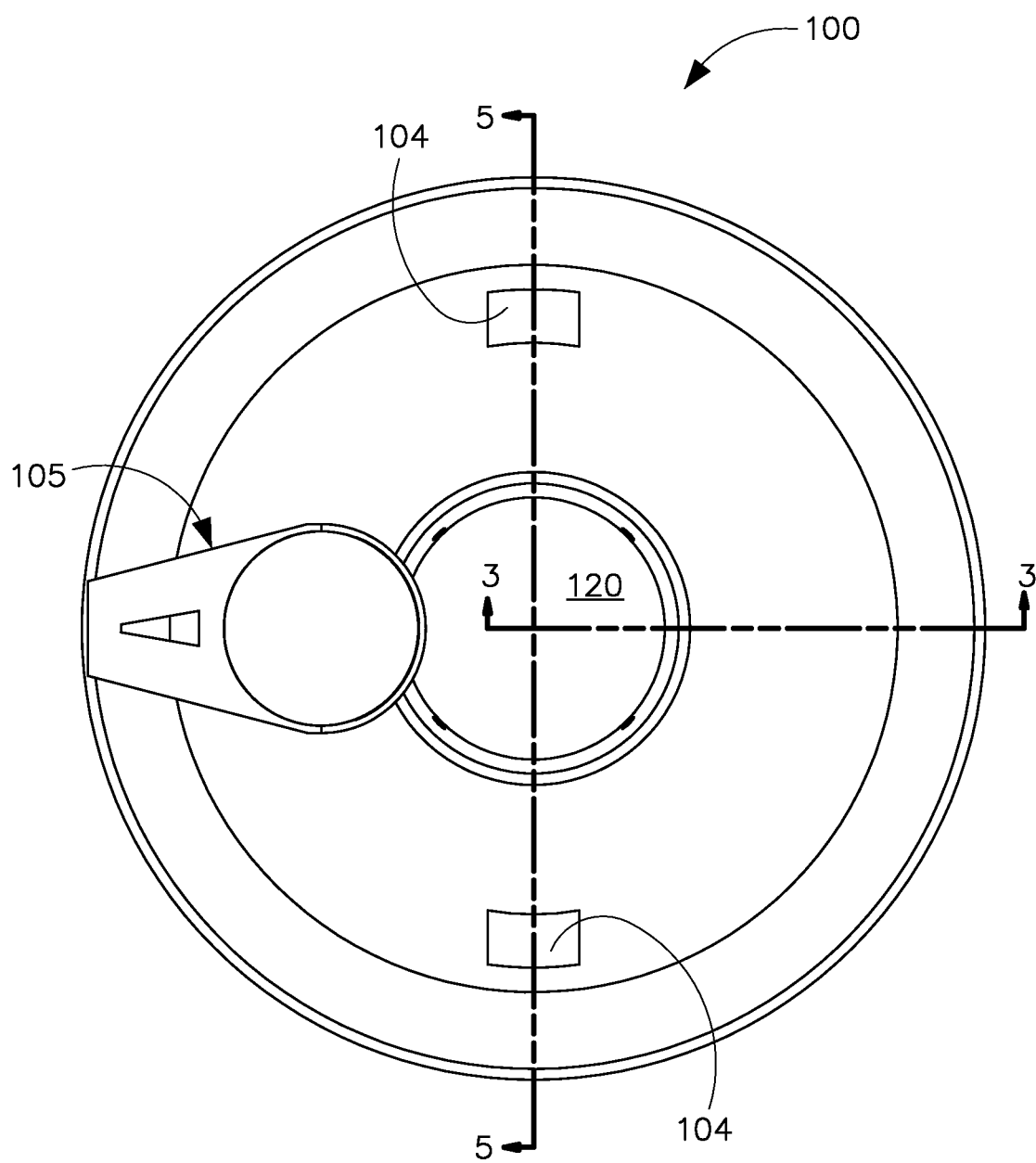
FIG. 4 is a top view of the embodiment of an automatic watering system with a refill indicator and gripping mechanisms as illustrated in FIG. 1A according to the present invention.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims. The figures are illustrative of an embodiment of an automatic watering system 100. Similar reference numerals are used in the various figures to represent like parts throughout the several views.

Referring now to FIG. 1A, a perspective view of an embodiment of an automatic watering system 100 with a refill indicator 105 and gripping mechanisms 104 according to the present invention is illustrated. In addition to the refill indicator 105 and gripping mechanisms 104, the automatic watering system 100 may include an internal receiving section 126 and an internal water feeding section 124 with a plurality of water feed apertures 116. The receiving section 126 may receive a plant 15 growing in a growth medium 16, such as, but not limited to, soil or other particulate matter (See FIG. 6). The water feeding section 124 is proximal to a base 120 of the automatic watering system 100. In the exemplary embodiment, the receiving section 126 is shown as frustoconical and the water feeding section 124 is shown as cylindrical; however, these sections can be of any geometry, dependent generally only on the desired shape of the overall flower pot.

The automatic watering system 100 may comprise an upper water storage reservoir 114A in fluid communication with a lower water feed reservoir 114B, which has the plurality of water feed apertures 116 in fluid communication with the water feeding section 124. The refill indicator 105 may provide for fluid communication between the upper water storage reservoir 114A and the lower water feed reservoir 114B. The automatic watering system 100 may further include an air return conduit 110 that also provides for fluid communication between the upper water storage reservoir 114A and the lower water feed reservoir 114B. The air return conduit 110 works in conjunction with the refill indicator 105 regarding the flow of water between the upper water storage reservoir 114A and the lower water feed reservoir 114B, as will be described in more detail below in connection with FIG. 3A.

The automatic watering system 100 may further include a drain plug 118 positioned within the base 120. The drain plug 118 covers an aperture which allows water to exit the water feeding section 124 and the receiving section 126 should it be desired to empty these sections of water and/or to use the system as a more conventional flower pot. Also, the drain plug 118 can be removed if the automatic watering system is used outside. For example, when used outside, the drain plug can be removed in the case that it rains into the pot. If the drain plug 118 is not removed, the rain water can fill the receiving section, flooding the plant and roots, and overflow the sides of the device. If the drain plug 118 is removed, water can exit the device through the aperture. Preferably, the aperture has walls 119 extending upwards into the water feed reservoir 114B to a height above L3 (see disclosure of L3 herein), whereby removing drain plug 118 will not cause the water level within water feed reservoir 114B to fall below the level of L3. The drain plug 118 forms an air and/or water tight seal and may be removed when water within the automatic watering system 100 is desired to be removed.

The automatic watering system 100 may include gripping mechanisms 104 for assisting in placing the system 100 in and removing the system 100 from a conventional flower pot or other optional container 128. The gripping mechanisms 104 may comprise indentations, concave regions, ridges, or depressions within the receiving section 126. The gripping mechanisms 104 may be positioned within close proximity to a top portion 122 of the automatic watering system 100. For example, a beginning edge of a gripping mechanism 104 may be positioned within a convenient distance from the upper edge of the top portion 122, dependent on the overall size and shape of the pot. It has been found that a distance of between 5 mm and 50 mm is satisfactory for most versions of the device; however, this range is illustrative only and not limiting.

Figure 6:
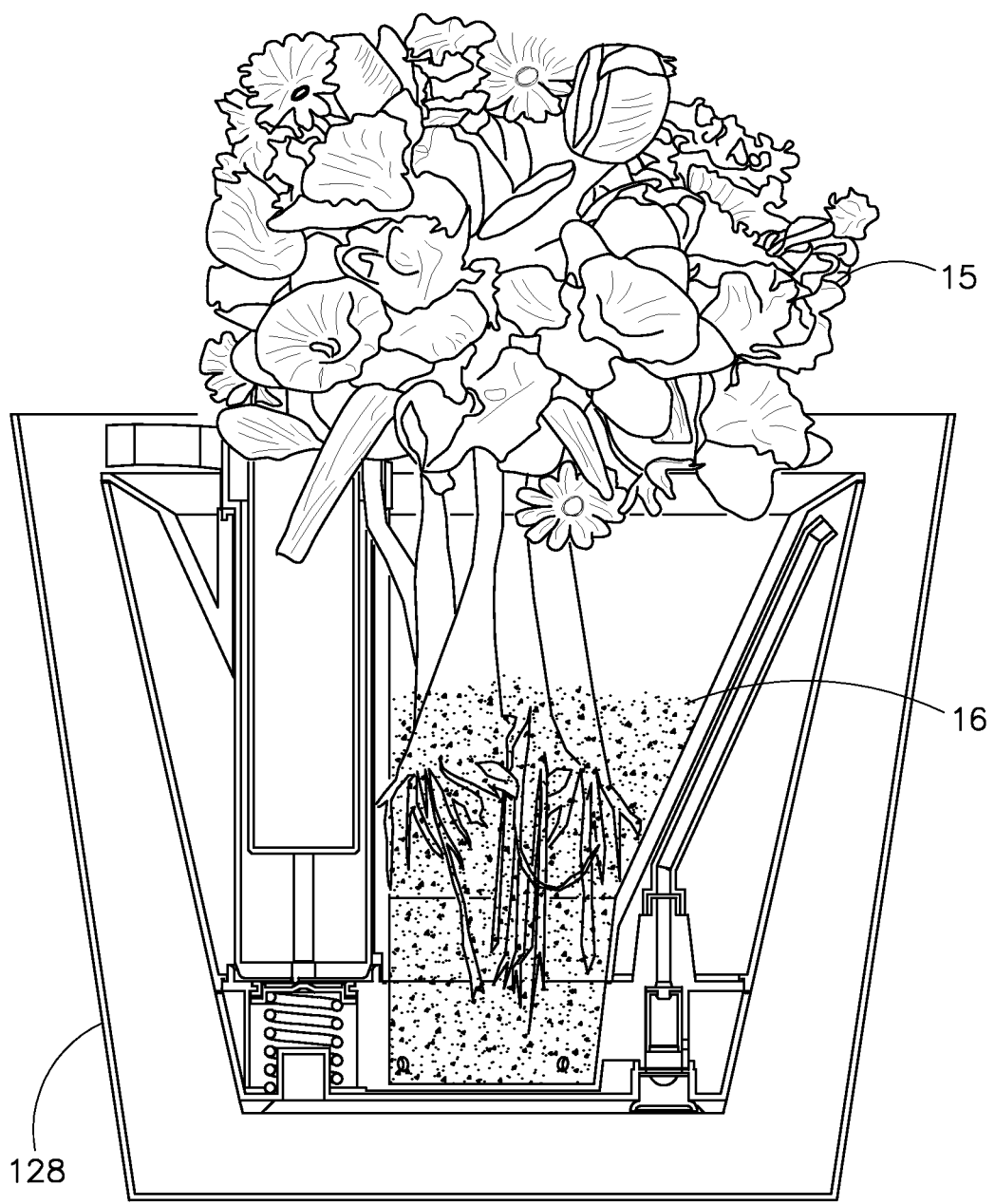
FIG. 6 is a side view of an embodiment of an automatic watering system with a refill indicator and gripping mechanisms in combination with a container for receiving the system according to the present invention.

The gripping mechanisms 104 are usually provided in pairs diametrically opposed (180°) along the sides of receiving section 126. The gripping mechanisms 104 typically have a geometry and size which conform or are conducive to receiving thumbs or fingers of a human operator. The gripping mechanisms 104 may assist a human operator from removing the automatic watering system 100 from another container 128 as illustrated in FIG. 6 and which will be described below.

The gripping mechanisms 104 illustrated in the figures have rectangular shaped sections. However, other geometric shapes for the gripping mechanisms 104 are possible and are within the scope of the present invention. For example, other shapes include, but are not limited to, oval, round, elliptical, square, pentagonal, hexagonal, octagonal, etc. The gripping mechanisms 104 may have a depth convenient for allowing a suitable gripping by the user and/or that is dependent on the overall size and shape of the pot. It has been found that a depth of between 2 mm and 20 mm is satisfactory for most versions of the device; however, this range is illustrative only and not limiting.

The automatic watering system 100 may further include a refill indicator 105 for assisting an operator in determining the amount of water remaining in the system 100. The refill indicator 105 preferably is a generally cylindrical component that may be received in a cooperating tubular indicator sleeve 111 of the receiving section 126 of the system 100. In other words, the indicator sleeve 111 which is part of the receiving section 126 can have a complimentary geometry that receives the cylindrical body of the refill indicator 105. The complimentary geometry may also include a cam lock section which receives a top section of the refill indicator 105 so that the refill indicator 105 may be locked in place in the indicator sleeve 111 by the cam lock section in known manners. According to one exemplary embodiment, the refill indicator 105 having a cylindrical body is removable, which means that it may be removed from the indicator sleeve 111 of the receiving section, and thus from the automatic watering system 100 entirely.

When the refill indicator 105 is engaged with the automatic watering system 100, a lower end of the refill indicator 105 presses against a movable and biased seal 108 located at the bottom of the indicator sleeve 111 so that an internal volume of the indicator sleeve 111 is in fluid communication with the lower water feed reservoir 114б. For example, nubs 132 on the bottom of refill indicator 105 can interact with a raised ridge 134 on the top of seal 108, whereby rotation of refill indicator 105 causes nubs 132 to contact and press downwards on raised ridge 134 and therefore on seal 108, thus opening seal 108. Sides of raised ridge 134 can be sloped to assist with or better cooperate with nubs 132 as nubs 132 are rotated to act on raised ridge 134. A nub 132 or preferably nubs 132 are located on opposite sides of a hole 136 on the bottom of refill indicator 105. Hole 136 allows water within indicator sleeve 111 to exit indicator sleeve 111 into water feed reservoir 114б, and allows water within water feed reservoir 114б, and particularly within water tube 132, to enter indicator sleeve 111.

As disclosed herein, water within water storage reservoir 114A can interact with the float body 102. For example, the wall of indicator sleeve 111 comprises one or more slots 151 therethrough to allow water to pass freely between water storage reservoir 114A and the interior of indicator sleeve 111. Therefore, the float body 102 inside of indicator sleeve 111 is always open to water in the water storage reservoir 114A acting upon the float body 102, whereby the float body 102 can give a representation of the amount of water located in the water storage reservoir 114A, and thus in the device.

The bias or force for the seal 108 may be provided by a spring 106 that is coupled to the seal 108. Seal 108 and spring 106 are located in water tube 130, which is substantially or completely located within the water feed reservoir 114B. There is a space or open area between the lower end of the water tube 130 and the bottom of the water feed reservoir 114б so as to allow water from upper water storage reservoir 114A to exit refill indicator 105 through hole 136 and enter water feed reservoir 114B, and to allow air to enter refill indicator 105 and travel to the water storage reservoir 114A when the level of water within water feed reservoir 114б falls below L1.

When removing the refill indicator 105 from indicator sleeve 111 and the automatic watering system 100, refill indicator 105 is rotated, whereby in a preferred embodiment nubs 132 are moved off of raised ridge 134 and/or seal 108, thereby allowing seal 108 to be elevated by the spring 106 in a direction towards the top portion 122, which closes off the lower water feed reservoir 114б from the internal volume of indicator sleeve 111 and from water storage reservoir 114A. Preferably, the seal 108 forms an air-tight and water-tight seal at the location where indicator sleeve 111 is designed to engage the lower water feed reservoir 114б, thereby preventing water from exiting the water feed reservoir 114B into the interior volume of indicator sleeve 111 and/or into water storage reservoir 114A. In other words, when refill indicator 105 is contained within indicator sleeve 111, refill indicator 105 presses down on seal 108, or nubs 132 press down on seal 108 or on raised ridge 134 of seal 108, biasing seal 108 downwards, opening a port at the top of water tube 130, and allowing water to flow between water feed reservoir 114б and water storage reservoir 114A, in one embodiment through hole 136 and slot 151.

While seal 108, indicator sleeve 111, and water tube 130 have been illustrated with a circular geometry in the exemplary embodiment illustrated, other geometric shapes are possible and are within the scope of the invention. Other shapes include, but are not limited to, oval, elliptical, square, rectangular, pentagonal, octagonal, etc. Usually, the geometry of seal 108 will generally match the geometry for refill indicator 105 and indicator sleeve 111. The spring 106 may comprise a coil spring of the helical type, or any other suitable spring mechanism. For example, other types of springs 106 may be used and include, but are not limited to, volute springs, etc.

Referring now to FIG. 1B, a side view of refill indicator 105 removed from receiving column 111 of the upper water storage reservoir 114A (See FIG. 1A) is illustrated. The refill indicator 105 may comprise a concave lid 103. The refill indicator 105 may further include at least one elongated opening or slot 151 that allows the inner chamber of refill indicator 105 containing float body 102 to be in fluid communication with the upper water storage reservoir 114A. The float body 102 may comprise a convex end 113, such as a semi-spherical shape, which has a geometry that matches the concave lid 103 such that the concave end 113 may fit within the concave lid 103 and be more visible to the user, especially when the upper water storage reservoir 114A is full or nearly full of water. Further details of the removable refill indicator 105 are described below.

Referring now to FIG. 2, a side view of the embodiment of an automatic watering system 100 with a refill indicator 105 and gripping mechanisms 104 as illustrated in FIG. 1 according to the present invention is illustrated. The refill indicator 105 may include and enclose the float body 102. The float body 102 may track the height of the water contained within the upper water storage reservoir 114A. As mentioned, the float body 102 may include a convex end 113 which fits within and preferably is visible through concave lid 103 of refill indicator 105. Thus, the concave lid 103 of the refill indicator 105 may be made from a material that is transparent such that the convex end 113 may be readily visible from a top perspective (such as illustrated in FIG. 4 described below). For example, the convex end 113 may be provided with a bright color, such as green, red, yellow, or orange so that the height of the float body 102 within the indicator sleeve may be readily ascertained. However, other colors may be used without departing from the scope and spirit of the invention.

In operation, the float body 102 may move upward and downward as indicated by arrow H, with the position of the float body 102 corresponding to the level of water contained within the upper water storage reservoir 114A, due to slot 151 which is in fluid communication with the upper water storage reservoir 114A. For example, slot 151 allows water from the upper water storage reservoir 114A to enter the interior volume of refill indicator 105 and act (press/push-up on) upon float body 102. The float body 102 preferably has a lower density than water, and therefore, float body 102 rises/falls within refill indicator 105 when the water level rises/falls.

If there is no water in the upper water storage reservoir 114A, then no water will flow into the interior volume of feed indicator 105, and therefore, the float body 102 will not rise. Thus, the amount that float body 102 rises within refill indicator 105 indicates the relative total quantity of water within the upper water storage reservoir 114A.

Referring to FIG. 2, water moves from the lower water feed reservoir 114B to the receiving section 126 through water apertures 116. A geometric center of each water aperture 116 defines a horizontal line or level L2. The upper end of the water tube 130 is located proximal to the bottom of the water storage reservoir 114A. The lower end of the water tube 130 is located within the water feed reservoir 114B, ends a certain distance above the bottom of the water feed reservoir 114B, and defines a horizontal line or level L1, which is below the level L2 by a predetermined distance. There is a space or open area between the lower end of the water tube 130 and the bottom of the water feed reservoir 114B so as to allow water from upper water storage reservoir 114A to exit refill indicator 105 through hole 136 and enter water feed reservoir 114B through water tube 130, and to allow air to enter refill indicator 105 and travel to the water storage reservoir 114A when the level of water within water feed reservoir 114B falls below L1. This predetermined distance between level L1 and level L2 may be determined by the size and shape of the overall pot. It has been found that a distance of between about 2 mm and 50 mm is suitable for most applications of the system 100; however, this range is illustrative only and not limiting.

Referring now to FIG. 3, a partial side, cross-sectional view of the system with the air return conduit 110 visible is shown, excluding the refill indicator 105. The refill indicator 105 has been excluded from this view for clarity and ease of explanation for operation of the invention. As can be seen, air return conduit 110 is primarily located within the water storage reservoir 114A, with the lower end 153 of air return conduit 110 being located proximal to or at the top of the water feed reservoir 114B. The lower end 153 of air return conduit 110 is in fluid communication with float valve housing 115, which extends into the water feed reservoir 114B. The float valve housing 115 comprises an opening 155, the top of which defines a horizontal line or level L3, which is above the level L2 (defined by the geometric center of each water aperture 116) by a predetermined distance. The lower end 153 of air return conduit 110 is located within and proximal to the top of the water feed reservoir 114B so as to allow air to enter air return conduit 110 and travel from water feed reservoir 114B into water storage reservoir 114A as disclosed herein. Line or level L3 is located above the level L2 by a predetermined distance. This predetermined distance between level L2 and level L3 may be determined by the size and shape of the overall pot. It has been found that a distance of between about 2 mm and 80 mm is suitable for most applications of the system 100; however, this range is illustrative only and not limiting.

The air return conduit 110 may include a float valve housing 115 proximate to the lower end 153 described above, which lower end 153 is closest to the bottom portion of the water storage reservoir 114A and preferably at least partially located within the water feed reservoir 114B. This float valve 115, containing a float 157, substantially seals the air return conduit 110 when water is at a predetermined level in the water feed reservoir 114B. For example, as water within the water feed reservoir 114B rises and enters an opening 155 within the float valve 115, the water causes the float 157 within float valve 115 to rise and cooperate with a sealing ring or shoulder, thereby shutting/closing air return conduit 110 and preventing any more air from exiting water feed reservoir 114B and entering water storage reservoir 114A. Water exiting water storage reservoir 114A through refill indicator 105 into water feed reservoir 114B therefore causes a negative pressure within water storage reservoir 114A, thereby holding the float 157 within float valve 115 in the closed position against sealing ring or shoulder, and thereby preventing any additional water from exiting water storage reservoir 114A through refill indicator 105 until, as disclosed herein, the water level in water feed reservoir falls below L1. The float valve 115 may comprise cylindrical float 157, but other types of floats 157 and/or valves 115 are possible and are within the scope of the present invention.

In additional detail, with these predefined levels L1, L2, and L3 between the ends of the air return conduit 110, the refill indicator 105, and the water feed apertures 116, the automatic watering system 100 operates as follows. When the water storage reservoir 114A contains water and refill indicator 105 is inserted into the indicator sleeve 111, refill indicator 105 is rotated such that nubs 132 interact with raised ridge 134 such that seal 108 is biased downward allowing water to flow between water storage reservoir 114A and water feed reservoir 114B. Thus, water can flow out of the water storage reservoir 114A into the water feed reservoir 114B, and air in the water feed reservoir 114B can escape through the air return conduit 110 and into the water storage reservoir 114A. Air escapes through the air return conduit 110 from the water feed reservoir 114B until the float valve 115 (having float 157) seals the lower end of air return conduit 110. Thereafter, this causes negative pressure in the water storage reservoir 114A, whereupon water flows outside of the water feed reservoir 114B through each of the water feed apertures 116 until the water level in the water feed reservoir 114B drops below the water feed apertures 116, which define level L2.

Subsequently, when the water level of the water feed reservoir 114B drops below level L1 defined by the bottom of the refill indicator 105, air is allowed to escape into the water storage reservoir 114A through the water tube 130, whereupon during pressure equalization between the water storage reservoir 114A and the water feed reservoir 114A, the float valve 115 is released and/or opens and allows a flow of water from the water storage reservoir 114A to the water feed reservoir 114B.

Referring now to FIG. 4, a top view of the embodiment of an automatic watering system 100 with a refill indicator 105 and gripping mechanisms 104 as illustrated in FIG. 1 according to the present invention is illustrated. As noted previously, the gripping mechanisms 104 may be disposed in pairs located on opposite sides of the system 100. However, additional or fewer gripping mechanisms 104 may be provided without departing from the scope and spirit of the invention. Further, the gripping mechanisms 104 may be provided such that each mechanism 104 does not face an opposing mechanism 104 across on opposite sides of the system 100.

As illustrated in FIG. 4, the drain plug 118 covers an aperture which is in fluid communication with the exterior of the system 100. However, the position of the drain plug 118 may be shifted as desired. For example, the drain plug 118 could be shifted to the geometric center of the bottom of the base 120. As disclosed herein, the aperture closed by drain plug 118 allows for the drainage of water from the interior of receiving section 126.

FIG. 5 is another side cross-sectional view of the automatic watering system 100 as illustrated in FIG. 1A according to the present invention. In this view, the refill indicator 105 has been rotated to the center of the system 100. In this view, the volumes for the upper water storage reservoir 114A and the lower water feed reservoir 114B are more visible.

Referring now to FIG. 6, a side view of an embodiment of an automatic watering system 100 with a refill indicator 105 and gripping mechanisms 104 in combination with a second container 128 for receiving the system 100 according to the present invention is illustrated. The second container 128 may comprise a flower pot, including an ornamental or aesthetically pleasing flower pot. Such flower pots may be made of any material, including but not limited to plastic, wood, clay, ceramic, composites, alloys, or metal.

Similarly, several of the parts for the automatic watering system 100 made be made from any material, including but not limited to plastic, wood, ceramic, composites, alloys, or metals. According to one exemplary embodiment, many of the parts described above are made from plastic and can be made with conventional injection molding techniques as known to those of ordinary skill in the art. A few of the materials may preferably be made of metal such as, but not limited to, the spring 106 for the seal 108.

The automatic watering system 100 may be constructed to be of generally any size and shape, much like a conventional flower or plant pot. Also, the automatic watering system 100 may be constructed to be of a size and shape to fit within a conventional or decorative flower or plant pot, such that the automatic watering system 100 is contained within a conventional or decorative flower or plant pot and not, or minimally, visible.

Similarly, the automatic watering system 100 may be constructed such that the upper water storage reservoir 114A and the lower water feed reservoir 114B have any desired capacity, namely can contain any desired fluid capacity. For example, the upper water storage reservoir 114A and the lower water feed reservoir 114B of larger versions of the automatic watering system 100 will have relatively greater fluid capacities and the upper water storage reservoir 114A and the lower water feed reservoir 114B of smaller versions of the automatic watering system 100 will have relatively smaller fluid capacities.

In use, the automatic watering system 100 may receive a plant growth medium 16, such as soil, in the receiving section 126. However, other growth mediums 16 may be used, such as, but not limited to, sand, rocks, combinations thereof, and other particulate matter suitable for sustaining life of a plant 15. The plant 15 will have roots that extend through the growth medium 16 so as to receive water from the water feed reservoir 114B. As the plant feeds on the water and/or water evaporates from the growth medium 16, these conditions cause water in the water feed reservoir 114B to evaporate or be consumed, whereby the water level in the water feed reservoir 114B drops below level L1 (See FIG. 3). When the water level in the water feed reservoir 114B drops below level L1, air can travel upwards through water tube 130 into water storage reservoir 114A, thereby reducing or eliminating the negative pressure in water storage reservoir 114A and allowing float valve 115 to open, which allows air to travel upwards through air return conduit 110 into water storage reservoir 114A so as to allow water to flow from water storage reservoir 114A into water feed reservoir 114B, in a cyclical manner.

With a pair of gripping mechanisms 104 disposed on diametrically opposite locations of the top portion of the system 100, an operator may be able to easily remove the system 100 from the second container 128. According to a preferred and exemplary embodiment of the system 100, the system 100 is sized such that it may snugly fit within the confines of the second container 128. In this way, the gripping mechanisms 104 can become an important feature of the invention for removing the system 100 from the second container 128 when a snug fit exists between the second container 128 and an external surface of the system 100.

Various alternate embodiments of the invention are contemplated. For example, although the receiving section 126 has been illustrated with a frustoconical shape, other shapes, such as, but not limited to, cylindrical may be employed. Further, while the illustrated embodiments show a removable refill cylinder 105, a permanently attached refill cylinder 105 could be provided and which would eliminate the need for seal 108 and spring 106.

Accordingly, while the invention has been described with reference to the structures disclosed, it is not confined to the details set forth herein, but is intended to cover such modifications or changes that may fall within the spirit and scope of the invention.

What is claimed is:
1. An automatic watering system comprising:
 a receiving section for receiving a plant, the receiving section comprising an indicator sleeve;
 a water storage reservoir;
 a refill indicator comprising a cylindrical body and an inner chamber, the refill indicator being received in the indicator sleeve;
 a water feed reservoir positioned elevationally below the water storage reservoir, the water feed reservoir having a plurality of water feed apertures aligned substantially horizontally for allowing water to pass from the water feed reservoir to outside of the water feed reservoir, the water feed reservoir in fluid communication with the water storage reservoir through the refill indicator and terminating at a lower end at a horizontal level below the plurality of water feed apertures, the water feed reservoir being further in fluid communication with the water storage reservoir through an air return conduit terminating at a lower end thereof at a horizontal level above the plurality of water feed apertures and having a float valve that substantially seals the air return conduit when water reaches a predetermined level in the water feed reservoir and thereafter while urged upward by a negative pressure in the water storage reservoir;
 the refill indicator in fluid communication with the water storage reservoir for indicating a water level present within the water storage reservoir; whereby with the water storage reservoir substantially filled, water flows out of the refill indicator and air in the water feed reservoir escapes through the air return conduit and into the water storage reservoir until the float valve seals the lower end of the air return conduit, thereafter causing negative pressure in the water storage reservoir, whereupon water flows outside of the water feed reservoir through each of the water feed apertures until the water level in the water feed reservoir drops below the water feed apertures, thereafter when the water level of the water feed reservoir drops below the refill indicator and air is allowed to escape into the water storage reservoir there through, whereupon during pressure equalization between the water storage reservoir and the water feed reservoir, the float valve is released allowing flow of water from the water storage reservoir through a drain conduit to the water feed reservoir; and a seal within the water feed reservoir for receiving the refill indicator, wherein the seal closes the water feed reservoir upon removal of the refill indicator from the automatic watering system.

2. The automatic watering system of claim 1, further comprising a gripping mechanism positioned near a top portion of the water storage reservoir.

3. The automatic watering system of claim 2, wherein the gripping mechanism comprises a geometry for receiving a shape corresponding to at least one of a finger and a thumb of an operator.

4. The automatic watering system of claim 1, wherein the refill indicator further comprises a float body which tracks a level of water within the water feed reservoir.

5. The automatic watering system of claim 1, wherein the refill indicator is removable from the automatic watering system.

6. The automatic watering system of claim 1, further comprising a spring, wherein the seal is coupled to the spring, the spring applying a force against the seal such that the seal closes the water feed reservoir upon removal of the refill indicator from the automatic watering system.

7. The automatic watering system of claim 1, further comprising a fluid drain plug that is removable and which drains water from the automatic watering system in a region outside of the water feed reservoir.

8. The automatic watering system of claim 1, wherein an external surface of the water storage reservoir defines a frustroconical-shaped volume.

9. The automatic watering system of claim 8, wherein an external surface of the water feed reservoir defines a cylindrical shaped fluid feed chamber.

10. The automatic watering system of claim 1, wherein the water storage reservoir surrounds at least a portion of the receiving section.

* * * * *